(12) United States Patent
Lee et al.

(10) Patent No.: US 12,189,431 B2
(45) Date of Patent: Jan. 7, 2025

(54) ELECTRONIC DEVICE AND METHOD FOR OPERATING ELECTRONIC DEVICE

(71) Applicant: SAMSUNG ELECTRONICS CO., LTD., Suwon-si (KR)

(72) Inventors: Donghan Lee, Suwon-si (KR); Jongah Kim, Suwon-si (KR); Jeongmin Park, Suwon-si (KR); Heewoong Yoon, Suwon-si (KR); Kihyuk Lee, Suwon-si (KR); Jeongho Cho, Suwon-si (KR); Gwangho Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/378,440

(22) Filed: Oct. 10, 2023

(65) Prior Publication Data

US 2024/0045473 A1    Feb. 8, 2024

Related U.S. Application Data

(63) Continuation of application No. PCT/KR2022/005335, filed on Apr. 13, 2022.

(30) Foreign Application Priority Data

Apr. 15, 2021    (KR) .................. 10-2021-0049383

(51) Int. Cl.
*G06F 1/16*    (2006.01)
*G06F 3/048*    (2013.01)

(52) U.S. Cl.
CPC .......... *G06F 1/1652* (2013.01); *G06F 1/1656* (2013.01); *G06F 3/048* (2013.01)

(58) Field of Classification Search
CPC ...... G06F 1/1652; G06F 1/1656; G06F 3/048; G06F 2200/1637; G06F 1/1679;

(Continued)

(56) References Cited

U.S. PATENT DOCUMENTS 7,608,791 B2   10/2009 Kung et al.
10,044,506 B2   8/2018 Seo
(Continued)

FOREIGN PATENT DOCUMENTS

JP        2015-72465 A    4/2015
KR   10-2001-0019495 A    3/2001
(Continued)

OTHER PUBLICATIONS

International Search Report (PCT/ISA/210) issued on Jul. 28, 2022 by the International Searching Authority in International Patent Application No. PCT/KR2022/005335.

(Continued)

*Primary Examiner* — Bryan Earles
(74) *Attorney, Agent, or Firm* — Sughrue Mion, PLLC

(57) ABSTRACT

An electronic device includes: a first housing; a second housing movably coupled to the first housing; a third housing movably coupled to the second housing; a flexible display on at least a portion of the first housing, the second housing, and the third housing; at least one sensor; one or more electromagnets; at least one processor operatively coupled to the at least one sensor; and a memory operatively coupled to the at least one processor, wherein the memory stores instructions that, when executed by the at least one processor, cause the electronic device to: detect, through the at least one sensor, a state change in at least one of first arrangement of the first housing with respect to the second housing or second arrangement of the third housing with respect to the second housing, and, based on the state change, control magnetism of at least one electromagnet among the one or more electromagnets.

18 Claims, 8 Drawing Sheets

(58) Field of Classification Search
CPC .... G06F 1/1616; G06F 1/1694; G06F 1/1677; H04M 1/0268; H04M 1/0214; H04M 1/0245; H04M 1/72454; H04M 2201/08; H04M 1/0216; H04M 1/72448; H04M 2201/34; H04M 2201/36; H04M 2250/12; Y02D 10/00

See application file for complete search history.

(56) References Cited

U.S. PATENT DOCUMENTS

| | | | |
|---|---|---|---|
| 10,271,438 | B2 | 4/2019 | Hirakata et al. |
| 10,452,106 | B2 | 10/2019 | Cho et al. |
| 10,551,880 | B1 | 2/2020 | Ai et al. |
| 10,860,274 | B2 | 12/2020 | Son et al. |
| 10,912,205 | B2 | 2/2021 | Hirakata et al. |
| 11,178,264 | B2 | 11/2021 | Kim et al. |
| 11,340,657 | B2 * | 5/2022 | Hirakata ............... G06F 3/0412 |
| 2011/0003616 | A1 | 1/2011 | Gorsica et al. |
| 2015/0057050 | A1 | 2/2015 | Park et al. |
| 2016/0026219 | A1 | 1/2016 | Kim et al. |
| 2017/0208157 | A1 * | 7/2017 | Kim ................... H04M 1/0268 |
| 2019/0069451 | A1 | 2/2019 | Myers et al. |
| 2019/0320048 | A1 * | 10/2019 | Yang .................... G06F 1/1652 |
| 2021/0365074 | A1 * | 11/2021 | Mehandjiysky ...... G06F 1/1652 |

FOREIGN PATENT DOCUMENTS

| | | |
|---|---|---|
| KR | 10-2009-0106934 A | 10/2009 |
| KR | 10-2016-0013748 A | 2/2016 |
| KR | 10-2016-0071625 A | 6/2016 |
| KR | 10-2016-0125169 A | 10/2016 |
| KR | 10-2017-0140976 A | 12/2017 |
| KR | 10-2018-0027467 A | 3/2018 |
| KR | 10-2019-0001822 A | 1/2019 |
| KR | 10-2020-0131662 A | 11/2020 |

OTHER PUBLICATIONS

Written Opinion (PCT/ISA/237) issued on Jul. 28, 2022 by the International Searching Authority in International Patent Application No. PCT/KR2022/005335.

* cited by examiner

ELECTRONIC DEVICE AND METHOD FOR OPERATING ELECTRONIC DEVICE

CROSS-REFERENCE TO RELATED APPLICATIONS

This application is a by-pass continuation application of International Application No. PCT/KR2022/005335, filed on Apr. 13, 2022, which is based on and claims priority to Korean Patent Application No. 10-2021-0049383, filed on Apr. 15, 2021, in the Korean Intellectual Property Office, the disclosures of which are incorporated by reference herein their entireties.

BACKGROUND

1. Field

One or more embodiments of the disclosure relate to an electronic device and a method for operating the electronic device. Specifically, the one or more embodiments may relate to a method for an electronic device to control magnetism.

2. Description of Relate Art

Recently, with the development of display technology, foldable electronic devices and rollable electronic devices employing flexible displays are popularized.

A partial region of a flexible display may include a folding region that may be deformed to a curved surface or flat surface. An electronic device employing a flexible display may have an area size of an exposed display which varies as the shape or structure of at least a part of the electronic device changes, and may provide screens of various sizes to a user.

Therefore, there is an increasing need for an electronic device having a flexible display to provide a seamless user experience to a user with respect to the flexible display.

A technical problem to be solved by an embodiment of the disclosure is to provide a method and device for dynamically controlling magnetism of an electronic device according to a user input.

A technical problem to be solved by an embodiment of the disclosure is to provide a method and device for enabling an electronic device to control magnetism of an electromagnet so as to activate the electromagnet or change a polarity thereof according to the purpose of use of the electronic device.

A technical problem to be solved by an embodiment of the disclosure is to provide a method and device for enabling an electronic device to control magnetism of an electromagnet so as to maximize user's experience on an in-folding and/or out-folding display of a foldable electronic device.

A technical problem to be solved by an embodiment of the disclosure is to provide a method and device for enabling an electronic device to control magnetism of an electromagnet so as to minimize the influence of the magnetism on internal and/or external elements.

SUMMARY

According to an aspect of the disclosure, An electronic device includes: a first housing; a second housing movably coupled to the first housing; a third housing movably coupled to the second housing; a flexible display on at least a portion of the first housing, the second housing, and the third housing; at least one sensor; at least one electromagnet; at least one processor operatively coupled to the at least one sensor; and a memory operatively coupled to the at least one processor, wherein the memory stores instructions that, when executed by the at least one processor, cause the electronic device to: detect, through the at least one sensor, a state change in at least one of first arrangement of the first housing with respect to the second housing or second arrangement of the third housing with respect to the second housing, and, based on the state change, control magnetism of at least one electromagnet among the at least one electromagnet.

According to an aspect of the disclosure, A method performed by an electronic device, the method comprising: detecting a state change in at least one of first arrangement of a first housing included in the electronic device with respect to a second housing in the electronic device or second arrangement of a third housing in the electronic device with respect to the second housing, through a sensor operatively coupled to the electronic device; and based on the state change, controlling magnetism of at least one electromagnet among at least one electromagnet in the electronic device.

According to embodiments of the disclosure, magnetism of an electronic device may be dynamically controlled according to a user input.

According to embodiments of the disclosure, an electronic device may control magnetism of an electromagnet so as to activate the electromagnet or change a polarity thereof according to the purpose of use of the electronic device.

According to embodiments of the disclosure, an electronic device may control magnetism of an electromagnet so as to maximize user's experience on an in-folding and/or out-folding display of a foldable electronic device.

According to embodiments of the disclosure, an electronic device may control magnetism of an electromagnet so as to minimize the influence of the magnetism on internal and/or external elements.

Besides, various effects may be provided that are directly or indirectly identified through the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

With respect to the description of the drawings, the same or similar reference signs may be used for the same or similar elements.

DETAILED DESCRIPTION

Hereinafter, one or more embodiments of the disclosure will be described in detail with reference to the accompanying drawings. However, it should be understood that the disclosure is not limited to specific embodiments, but rather includes various modifications, equivalents and/or alternatives of one or more embodiments of the disclosure.

Figure 1:
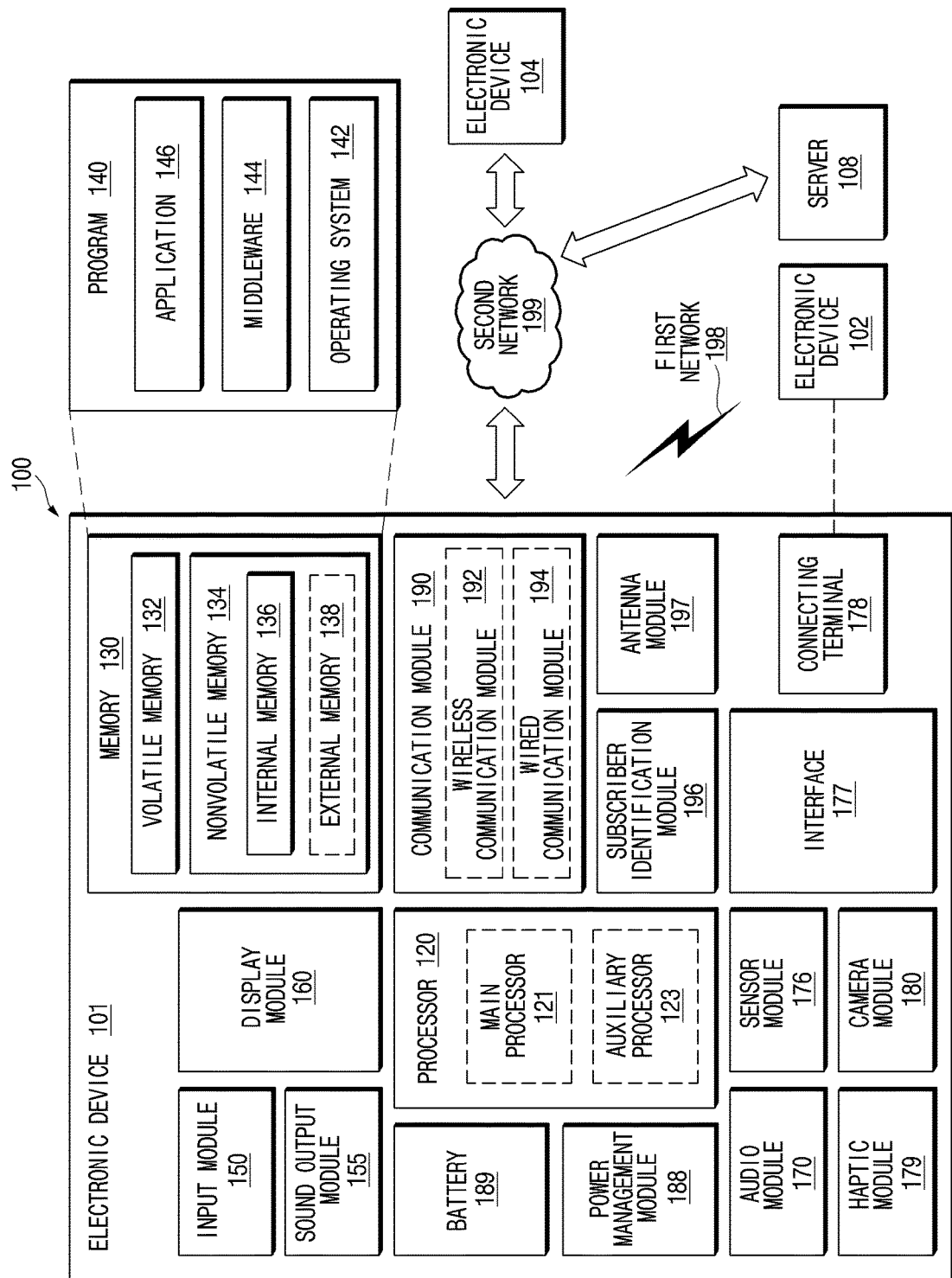
FIG. 1 is a block diagram illustrating an electronic device in a network environment according to one or more embodiments.

FIG. 1 is a block diagram illustrating an electronic device 101 in a network environment 100 according to one or more embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include at least one processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to one or more embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
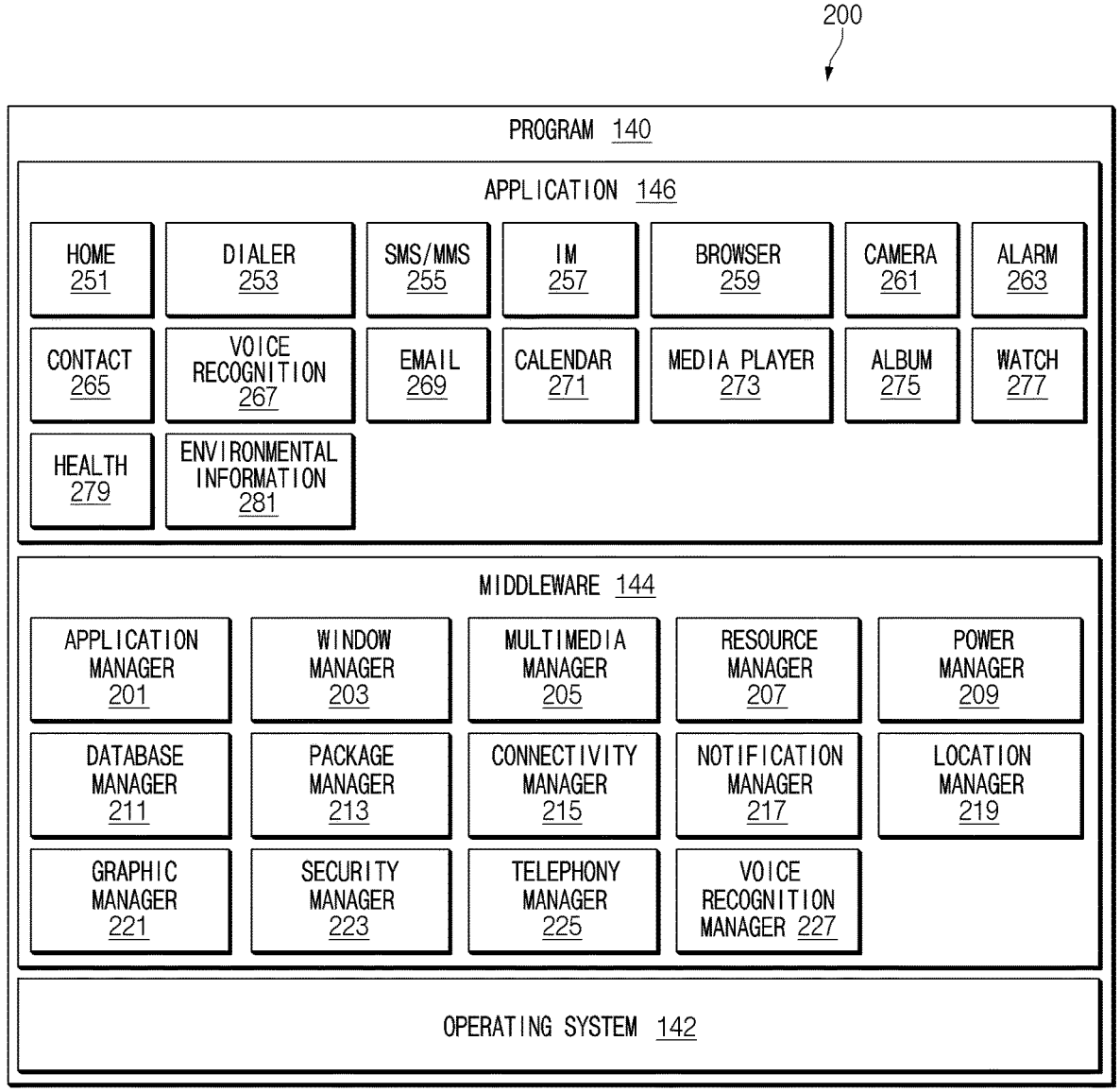
FIG. 2 is a block diagram illustrating a program according to one or more embodiments.

FIG. 2 is a block diagram 200 illustrating the program 140 according to one or more embodiments. According to an embodiment, the program 140 may include an operating system (OS) 142 to control one or more resources of the electronic device 101, middleware 144, or an application 146 executable in the OS 142. The OS 142 may include, for example, Android, iOS, Windows, Symbian, Tizen, or Bada. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3:
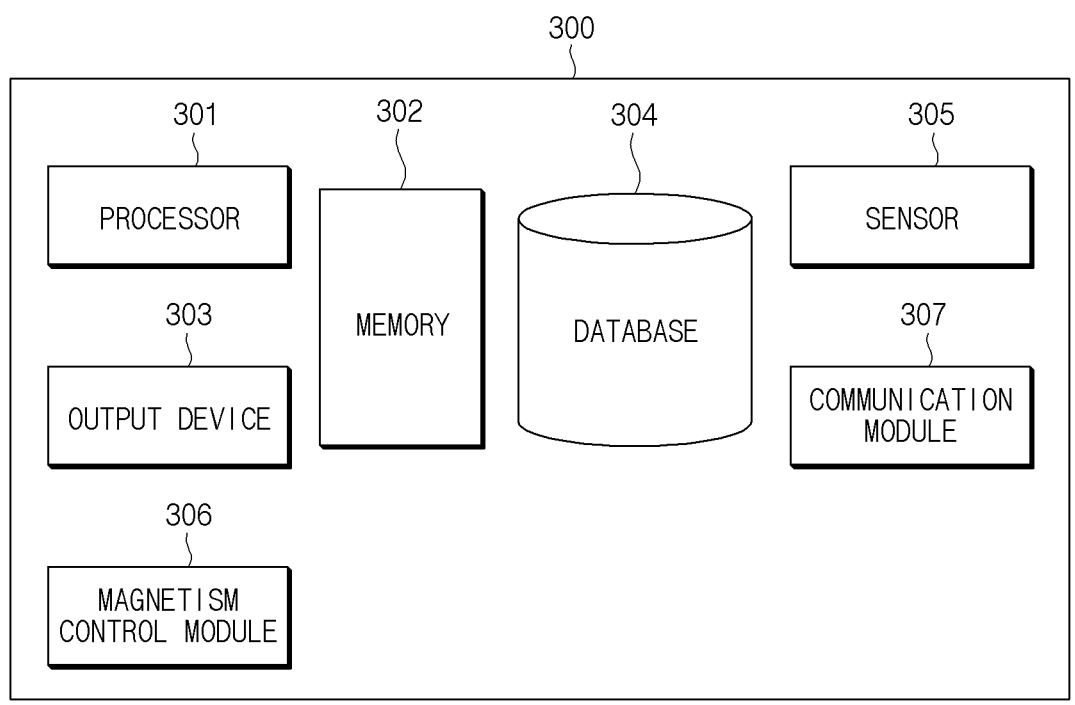
FIG. 3 is a block diagram illustrating a structure of an electronic device according to an embodiment of the disclosure.

FIG. 3 is a block diagram illustrating a structure of an electronic device 300 according to an embodiment of the disclosure. For clear explanation, descriptions overlapping with the above descriptions may be simplified or omitted.

Referring to FIG. 3, the electronic device 300 may include at least one processor 301 (e.g., the processor 120 of FIG. 1), a memory 302 (e.g., the memory 130 of FIG. 1), an output device 303, a database 304, a sensor 305, a magnetism control module 306, and a communication module 307 (e.g., the communication module 190 of FIG. 1). The output device 303 may include a display, a microphone (e.g., the input module 150 of FIG. 1), a speaker (e.g., the sound output module 155 of FIG. 1).

The electronic device 300 may further include at least one component in addition to the components illustrated in FIG. 3. According to an embodiment, the components of the electronic device 300 may be the same entity or constitute separate entities.

The electronic device 300 may include, for example, a smartphone, a tablet PC, a wearable device, a home appliance, or a digital camera. According to an embodiment, the processor 301 may control the memory 302, the output device 303, the database 304, the sensor 305, the magnetism control module 306, and the communication module 307 (e.g., the communication module 190 of FIG. 1) in order to perform an overall function of the electronic device 300. The output device 303 may be operatively coupled to the display, the microphone (e.g., the input module 150 of FIG. 1), and the speaker (e.g., the sound output module 155 of FIG. 1). The processor 301 may include, for example, at least one processor. The at least one processor may include, for example, an image signal processor (ISP), an application processor (AP), or a communication processor (CP).

Furthermore, the processor 310 may drive a module (e.g., the magnetism control module 306) by executing instructions stored in the memory 302.

An operation performed (or executed) by a module (e.g., the magnetism control module 306) in order to perform an overall function of the electronic device 300 may be construed as an operation performed by the processor 301 by executing the instructions stored in the memory 304.

In an embodiment, an operation performed (or executed) by each module (e.g., the magnetism control module 306) may be implemented as at least a portion of the processor 301.

Various modules mentioned in one or more embodiments of the disclosure may be implemented as hardware or software.

The memory 302 may store the database 304 including at least one piece of input data. The memory 302 may include commands, information, or data associated with operation of components included in the electronic device 300. For example, the memory 302 may store instructions that, when executed by the processor 301, cause the processor 301 to perform various operations disclosed in the disclosure.

In an embodiment, the electronic device 300 may receive a user input using the output device 303. The user input may be an input for a user to execute an app. In an embodiment, the user input may be a voice input (e.g., speech) of the user. When the user input is a voice input, the electronic device 300 may receive the user input through a microphone (or voice reception device). In an embodiment, the user input may be a touch input of the user. When the user input is a touch input, the electronic device 300 may receive the user input through the sensor 305.

The output device 303 may include a display. In an embodiment, the display may be configured with pixels. The pixels may be configured with sub-pixels such as red, green, and blue pixels.

The processor 301 may input data and allow a current to flow for each pixel of the display to exhibit colors from sub-pixels, and may implement overall color through a combination of exhibited colors.

The display may include various types of panels such as an LCD, quantum dot (QD), or micro LED having backlight in addition to OLED (AMOLED, PMOLED).

The sensor 305 may determine a state of the electronic device 300, analyze a pattern, and recognize a motion of the user. The sensor 305 may include a motion sensor capable of measuring a movement of the user. The motion sensor may include an accelerometer, a gyroscope, a barometer, a magnetic sensor, an angle sensor, a hall sensor, an electromagnetic sensor, etc.

The electronic device 300 may measure acceleration of the electronic device 300 using an accelerometer. For example, the accelerometer may determine a state of the electronic device 300 by measuring acceleration of gravity in a static state and measuring a change in acceleration due to a vibration or movement of the accelerometer in a dynamic state.

The electronic device 300 may determine a state of the electronic device 300 using a gyroscope. For example, the gyroscope may determine a movement state of the electronic device 300 by detecting a rotation angle of the electronic device 300.

The electronic device 300 may determine a state of the electronic device 300 using a magnetic sensor. For example, the magnetic sensor may determine a magnetic north by measuring an external magnetic field, and may determine a movement state of the electronic device 300 using the determined magnetic north.

The sensor 305 may include at least one of the accelerometer, the gyroscope, the barometer, the magnetic sensor, the angle sensor, the hall sensor, or the electromagnetic sensor.

The sensor 305 may further include a sensor for processing a value output through at least one of the accelerometer, the gyroscope, the barometer, the magnetic sensor, the angle sensor, the hall sensor, or the electromagnetic sensor.

The magnetism control module 306 may control magnetism of the electronic device 300 using a magnet and/or electromagnet included in the electronic device 300. The magnetism control module 306 may adjust strength of magnetic force of the electronic device 300 by adjusting intensity of current flowing through the electromagnet. The electromagnet may represent a magnet made by using the principle that a magnetic field is generated when current is allowed to flow through a conducting wire. The electromagnet temporarily exhibits magnetic force only when current flows through a coil, but may provide stronger magnetic force than a permanent magnet. The magnet provided to the electronic device 300 may be an electromagnet except for a magnet that generates magnetic force suitable for basic operation.

In an embodiment, at least one of the operations of the components of the electronic device 300 described with reference to the electronic device 300 may be performed (or executed) in an external server or another electronic device. For example, the processor 301 may transmit a user input to an external server or another electronic device using the communication module 307 so as to perform (or execute) at least one of the operations in the external server or other electronic device and receive a result of the performance (or execution).

The processor 301 may be configured with at least one processor, and may be physically divided into a main processor for performing a high-performance process and an auxiliary processor for performing a low-power process. Alternatively, one processor may switch between high-performance processing and low-power processing according to a situation.

Hereinafter, operation of the processor 301 will be described in detail.

In an embodiment, an electronic device may include a first housing, a second housing movably coupled to the first housing, a third housing movably coupled to the second housing, a flexible display disposed on at least a portion of the first housing, the second housing, and the third housing, at least one sensor, at least one electromagnet, at least one processor operatively coupled to the sensor, and a memory operatively coupled to the at least one processor, wherein the memory may store instructions that, when executed by the at least one processor, cause the at least one processor to detect, through the sensor, a state change in at least one of first arrangement of the first housing with respect to the second housing or second arrangement of the third housing with respect to the second housing, and control magnetism of at least one electromagnet among the at least one electromagnet based on the state change.

In an embodiment, the electronic device may cause the at least one processor to adjust the magnetism by adjusting at least one of magnetic strength or polarity strength of the at least one electromagnet.

In an embodiment, the at least one sensor may include at least one of an accelerometer, a gyroscope, a barometer, a magnetic sensor, an angle sensor, a hall sensor, or an electromagnetic sensor.

In an embodiment, the at least one sensor may further include a sensor for processing a value output through at least one of the accelerometer, the gyroscope, the barometer, the magnetic sensor, the angle sensor, the hall sensor, or the electromagnetic sensor.

In an embodiment, the electronic device may cause the at least one processor to adjust the magnetism of the electromagnet by adjusting intensity of current flowing through the electromagnet.

In an embodiment, the electronic device may cause the at least one processor to determine a folding state of the electronic device and select the electromagnet to be controlled based on the determined folding state.

In an embodiment, if the folding state of the electronic device is an in-folding state, and the state change is due to an input for unfolding an in-folded display, the electronic device may cause the at least one processor to reduce the strength of magnetism of an electromagnet mounted in a surface of the in-folded display.

In an embodiment, if the folding state of the electronic device is an out-folding state, and the state change is due to an input for unfolding an out-folded display, the electronic device may cause the at least one processor to reduce the strength of magnetism of an electromagnet mounted in an opposite surface of the out-folded display.

In an embodiment, if the state of the electronic device is determined to be a state in which the electronic device does not require magnetism, the electronic device may deactivate the strength of magnetism of all of the electromagnets mounted in the electronic device.

In an embodiment, the electronic device may cause the at least one processor to adjust the magnetism of electromagnets mounted in a surface to which the display included in the electronic device is attached to different polarities, and deactivate electromagnets mounted in a surface to which the display is not attached.

Figure 4:
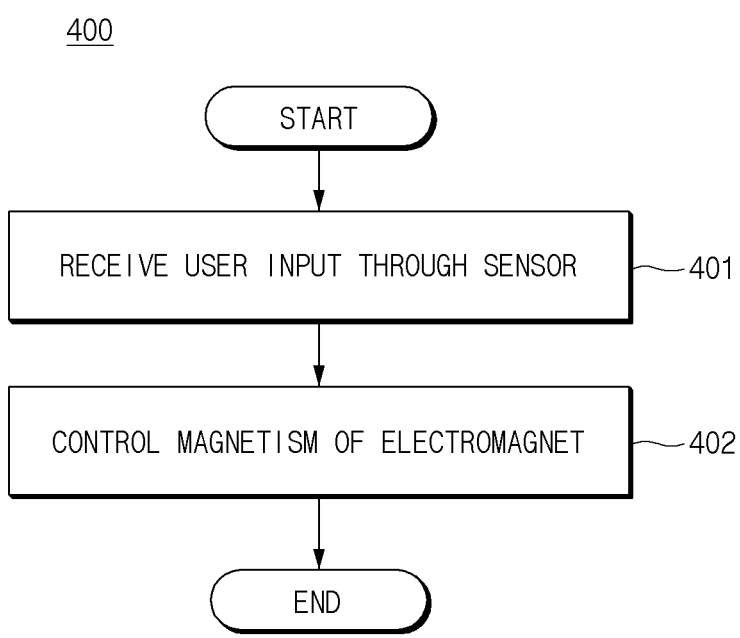
FIG. 4 illustrates a flowchart related to a method for an electronic device to control magnetism according to an embodiment of the disclosure.

Hereinafter, a method performed by the electronic device 101 according to an embodiment of the disclosure will be described with reference to FIGS. 4 and 5. FIG. 4 illustrates a flowchart 400 related to a method for the electronic device 101 to control magnetism according to an embodiment of the disclosure. According to an embodiment, the process illustrated in FIG. 4 may be construed as being performed by at least one processor (e.g., the processor 120 of FIG. 1) of an electronic device (e.g., the electronic device 101 of FIG. 1) by executing instructions stored in a memory (e.g., the memory 130 of FIG. 1).

In operation 401, the electronic device 101 may receive a user input through a sensor. The electronic device 101 may determine a state of the electronic device 101, analyze a pattern, and recognize a motion of the user through a sensor to receive the user input. The sensor may include a motion sensor capable of measuring a movement of the user. The motion sensor may include an accelerometer, a gyroscope, a barometer, a magnetic sensor, an angle sensor, a hall sensor, an electromagnetic sensor, etc.

In an embodiment, the electronic device 101 may determine a state of the electronic device 300 using a gyroscope. For example, the gyroscope may determine a movement state of the electronic device 101 by detecting a rotation angle of the electronic device 101.

In an embodiment, the electronic device 101 may determine a state of the electronic device 101 using a magnetic sensor. For example, the magnetic sensor may determine a magnetic north by measuring an external magnetic field, and may determine a movement state of the electronic device 101 using the determined magnetic north.

In an embodiment, the electronic device 101 may determine the strength of an electromagnet and/or magnet included in the electronic device 101 using a magnetic sensor. For example, if a state of the electronic device 101 is changed (for example, an in-folded display is unfolded, or an out-folded display is unfolded), a distance between the magnet and/or electromagnet and the magnetic sensor changes, and the strength of magnetism of the magnet and/or electromagnet may change due to change in the distance.

In an embodiment, the electronic device 101 may determine a state of the electronic device 101 using the changed strength of magnetism.

In operation 402, the electronic device 101 may control the magnetism of an electromagnet. The electronic device 101 may control magnetism of the electronic device 101 using the magnet and/or electromagnet included in the electronic device 101.

In an embodiment, the electronic device 101 may adjust the strength of magnetic force of the electronic device 101 by adjusting intensity of current flowing through the electromagnet.

Although FIG. 4 illustrates that the electronic device 101 sequentially performs operation 401 and operation 402, this is merely an example, and portion of the operations may be performed in the electronic device 101 and another portion may be performed in an external device.

Figure 5:
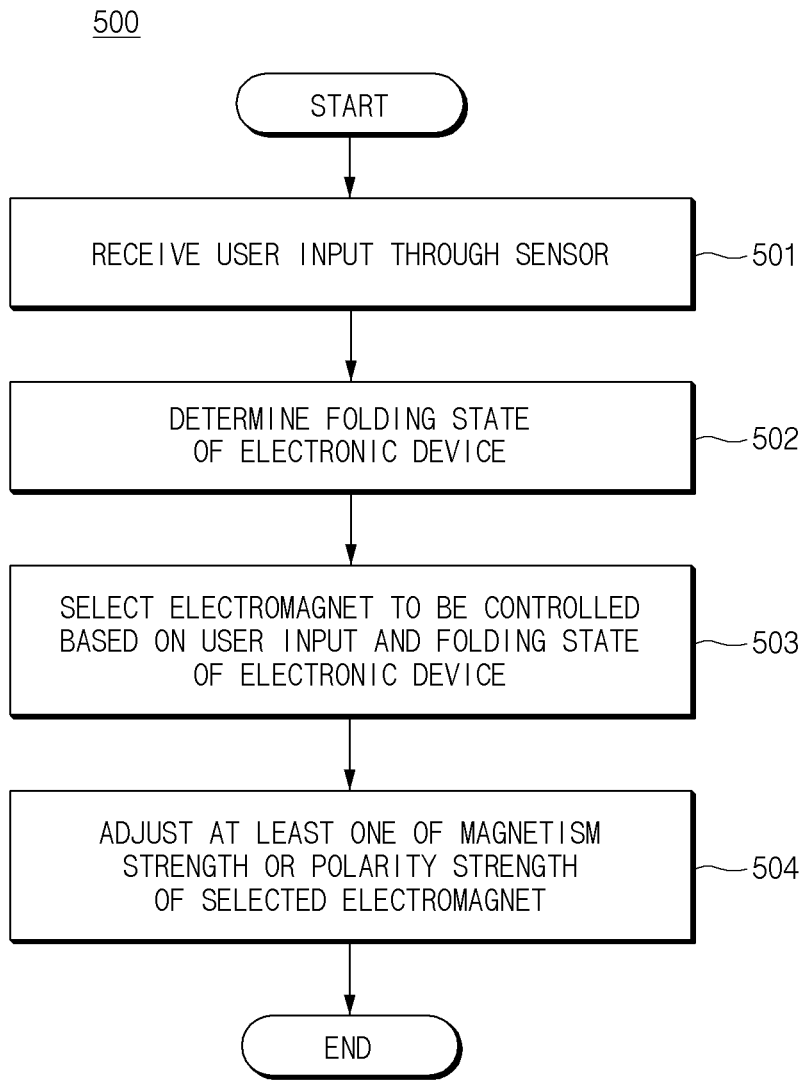
FIG. 5 illustrates another flowchart related to a method for an electronic device to control magnetism according to an embodiment of the disclosure.

FIG. 5 illustrates another flowchart 500 related to a method for the electronic device 101 to control magnetism according to an embodiment of the disclosure. According to an embodiment, the process illustrated in FIG. 5 may be construed as being performed by at least one processor (e.g., the processor 120 of FIG. 1) of an electronic device (e.g., the electronic device 101 of FIG. 1) by executing instructions stored in a memory (e.g., the memory 130 of FIG. 1).

In operation 501, the electronic device 101 may receive a user input through a sensor. The electronic device 101 may determine a state of the electronic device 101, analyze a pattern, and recognize a motion of the user through a sensor to receive the user input. The sensor may include a motion sensor capable of measuring a movement of the user. The motion sensor may include an accelerometer, a gyroscope, a barometer, a magnetic sensor, an angle sensor, a hall sensor, an electromagnetic sensor or others.

In an embodiment, the electronic device 101 may determine a state of the electronic device 101 using a hall sensor. For example, the hall sensor may determine a state of the electronic device 101 by detecting a change in a magnetic field.

In an embodiment, the electronic device 101 may determine a state of the electronic device 300 using a gyroscope. For example, the gyroscope may determine a movement state of the electronic device 101 by detecting a rotation angle of the electronic device 101.

In an embodiment, the electronic device 101 may determine a state of the electronic device 101 using an accelerometer. For example, the accelerometer may determine a posture based on gravity, and may determine a folding state of the electronic device 101 using the determined posture.

In an embodiment, the electronic device 101 may more accurately determine a folding state of the electronic device 101 using the hall sensor, the accelerometer, and/or the gyroscope in combination.

In an embodiment, the electronic device 101 may determine a state of the electronic device 101 using an electromagnetic sensor. For example, the electromagnetic sensor may detect a change in force applied to the electronic device 101 or a change in a magnetic field of the electronic device 101. The electromagnetic sensor may determine a state of the electronic device 101 using the detected change. The electromagnetic sensor may be embedded in an electromagnet included in the electronic device 101 may be included in the electronic device 101 separately from the electromagnet.

In an embodiment, the electronic device 101 may determine a state of the electronic device 101 using a magnetic sensor. For example, the magnetic sensor may determine a magnetic north by measuring an external magnetic field, and may determine a movement state of the electronic device 101 using the determined magnetic north.

In operation 502, the electronic device 101 may determine a folding state of the electronic device 101. The folding state of the electronic device 101 may represent a state in which the electronic device 101 is in-folded or a state in which the electronic device is out-folded. The in-folding may represent a state in which a display region is folded inwards. The out-folding may represent a state in which a display region is folded outwards.

In an embodiment, in the case where the electronic device 101 has a foldable structure, the electronic device 101 may determine a folding state of the electronic device using the above sensor. In an embodiment, in the case where the electronic device 101 has a foldable structure, the electronic device 101 may determine a folding state of the electronic device 101 using the strength of current magnetism of the magnet and/or electromagnet included in the electronic device 101.

In operation 503, the electronic device 101 may select an electromagnet to be controlled based on the user input and the folding state of the electronic device 101.

In an embodiment, in the case where the electronic device has a foldable structure with two hinge structures, and the user input is an input for unfolding an in-folded display, the electronic device 101 may select, as an electromagnet to be controlled, an electromagnet mounted in a surface of the in-folded display.

In an embodiment, in the case where the electronic device has a foldable structure with two hinge structures, and the user input is an input for unfolding an out-folded display, the electronic device 101 may select, as an electromagnet to be controlled, an electromagnet mounted in an opposite surface of the out-folded display.

In an embodiment, the electronic device 101 may determine a state in which magnetism is not required (for example, a state in which an in-folded or out-folded display is unfolded, a state in which a cover is not coupled, or a state in which a cradle is open). In this case, the electronic device 101 may select all of the electromagnets mounted in the electronic device 101 as electromagnets to be controlled.

Operation 503 will be described in more detail with reference to FIGS. 6 to 8.

In operation 504, the electronic device 101 may adjust at least one of magnetic strength or polarity strength of a selected electromagnet.

In an embodiment, in the case where the electronic device has a foldable structure with two hinge structures, and the user input is an input for unfolding an in-folded display, the electronic device 101 may control to reduce the magnetism of the selected electromagnet mounted in a surface of the in-folded display.

In an embodiment, in the case where the electronic device has a foldable structure with two hinge structures, and the user input is an input for unfolding an out-folded display, the electronic device 101 may control to reduce the magnetism of the selected electromagnet mounted in an opposite surface of the out-folded display.

In an embodiment, in the case where the electronic device 101 is in a state in which the magnetism is not required, the electronic device 101 may control to minimize the strength of magnetism of all of the electromagnets included in the electronic device 101. Since the electronic device 101 minimizes the strength of magnetism of all of the electromagnets, influence of the magnetism on internal elements may be minimized, and maximum performance of the internal elements may be secured.

In an embodiment, the electronic device 101 may change a polarity of an electromagnet. In the case where the electronic device 101 has a multi-folding structure, the electronic device 101 may be mounted with multiple magnets and/or electromagnets according to a folding position. The electronic device 101 may deactivate an electromagnet or change a polarity thereof by controlling magnetism according to a user input for each folding position and whether the folding is in-folding or out-folding. For example, the electronic device 101 may adjust the magnetism of electromagnets mounted in a attached surface to different polarities, and deactivate electromagnets mounted in an non-attached surface.

Operation 504 will be described in more detail with reference to FIGS. 6 to 8.

Although FIG. 5 illustrates that the electronic device 101 sequentially performs operation 501 to operation 504, this is merely an example, and a plurality of the operations may be simultaneously performed, or portion of the operations may be performed in the electronic device 101 and another portion may be performed in an external device.

In an embodiment, a method performed by an electronic device may include: if a process for a memory included in or coupled to the electronic device is executed, detecting a state change in at least one of first arrangement of a first housing included in the electronic device with respect to a second housing included in the electronic device or arrangement of a third housing included in the electronic device with respect to the second housing through a sensor included in or operatively coupled to the electronic device; and controlling magnetism of at least one electromagnet among at least one electromagnet included in the electronic device based on the state change.

In an embodiment, the method performed by the electronic device may further include controlling the magnetism by adjusting at least one of magnetism strength or polarity strength of the at least one electromagnet.

In an embodiment, the at least one sensor may include at least one of an accelerometer, a gyroscope, a barometer, a magnetic sensor, an angle sensor, a hall sensor, or an electromagnetic sensor.

In an embodiment, the at least one sensor may further include a sensor for processing a value output through at least one of the accelerometer, the gyroscope, the barometer, the magnetic sensor, the angle sensor, the hall sensor, or the electromagnetic sensor.

In an embodiment, the method performed by the electronic device may further include adjusting the magnetism of the electromagnet by adjusting intensity of current flowing through the electromagnet.

In an embodiment, the method performed by the electronic device may further include determining a folding state of the electronic device, and selecting the electromagnet to be controlled based on the determined folding state.

In an embodiment, the method performed by the electronic device may further include, if the folding state of the electronic device is an in-folding state, and the state change is due to an input for unfolding an in-folded display, causing, by the instructions, the at least one processor to reduce the strength of magnetism of an electromagnet mounted in a surface of the in-folded display.

In an embodiment, the method performed by the electronic device may further include, if the folding state of the electronic device is an out-folding state, and the state change is due to an input for unfolding an out-folded display, causing, by the instructions, the at least one processor to reduce the strength of magnetism of an electromagnet mounted in an opposite surface of the out-folded display.

In an embodiment, the method performed by the electronic device may further include, if the state of the electronic device is determined to be a state in which the electronic device does not require magnetism, deactivating the strength of magnetism of all of the electromagnets mounted in the electronic device.

In an embodiment, the method performed by the electronic device may further include adjusting the magnetism of electromagnets mounted in a surface to which a display included in the electronic device is attached to different polarities, and deactivating electromagnets mounted in a surface to which the display is not attached.

Hereinafter, a method for the electronic device 101 to control magnetism according to an embodiment will be described in detail with reference to FIGS. 6 and 7. In an embodiment, the electronic device may adjust so as to facilitate folding opening or closing only for a display of a surface desired by the user by controlling the strength of magnetism.

Figure 6:
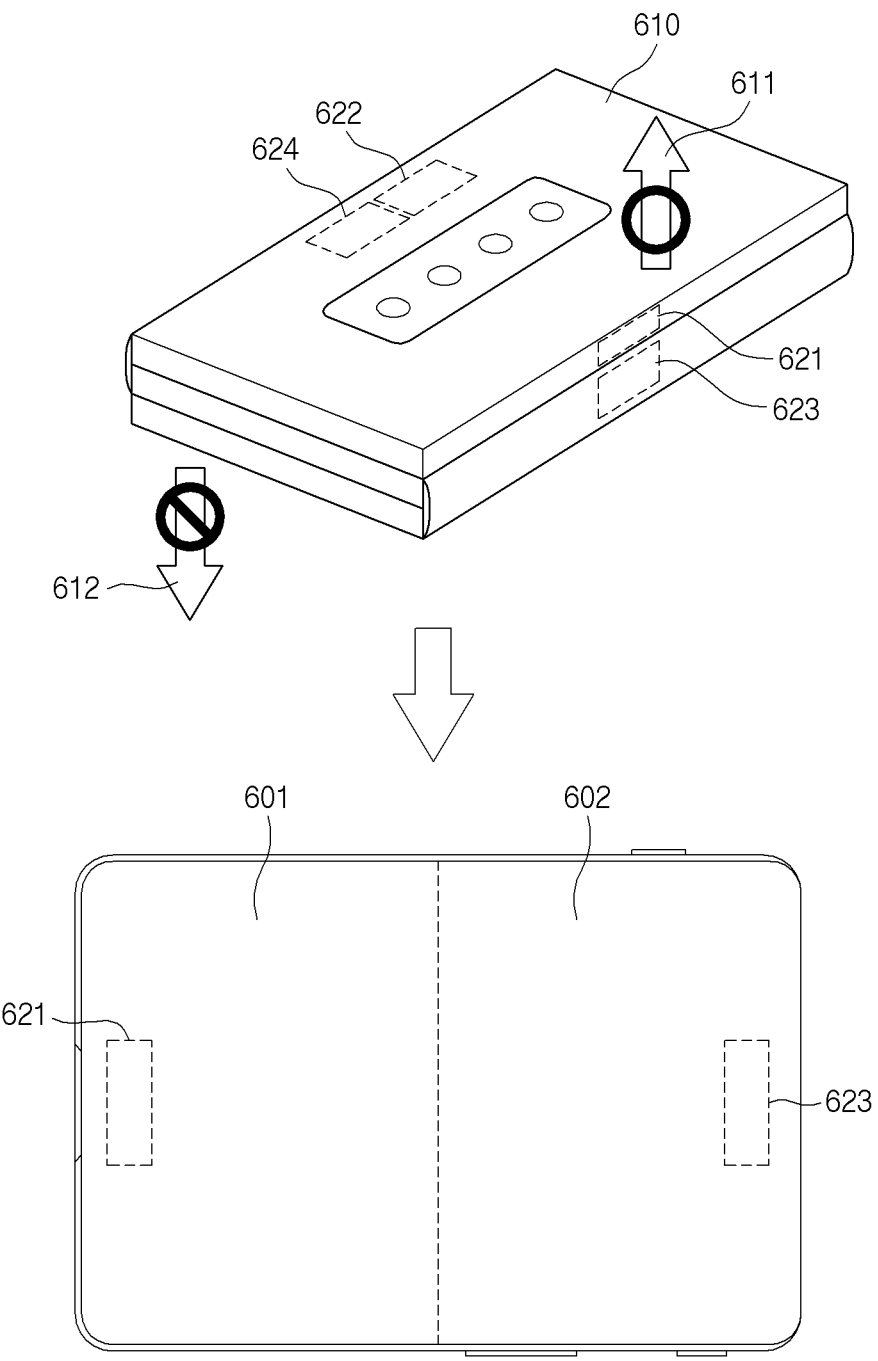
FIG. 6 is an example diagram illustrating a method for an electronic device having a foldable structure to unfold an in-folded display by controlling magnetism according to an embodiment of the disclosure.

FIG. 6 is an example diagram illustrating a method for an electronic device having a foldable structure to unfold an in-folded display by controlling magnetism according to an embodiment. The in-folding may represent a state in which a display region is folded inwards.

FIG. 6 illustrates an electronic device 610 having a foldable structure with two hinge structures. The electronic device having a foldable structure with two hinge structures may include displays 601, 602, and 701 (FIG. 7) on at least three sides.

The electronic device 610 having a foldable structure with two hinge structures illustrated in FIG. 6 may be capable of both out-folding and/or in-folding. The out-folding may represent a state in which a display region is folded outwards.

Referring to FIG. 6, the electronic device 610 may detect a user input 611 attempting to unfold an in-folded display. The electronic device 610 may monitor a state of the electronic device 610 using a sensor included in or operatively coupled to the electronic device 610. For example, the electronic device 610 may monitor a state of the electronic device 610 using a grip sensor and/or motion sensor.

In an embodiment, if a result of the monitoring indicates that only the user input 611 attempting to unfold an in-folded display is received and a user input 612 attempting to unfold an out-folded display is not received, the electronic device

610 may set the strength of magnetism of a first electromagnet 621 and a third electromagnet 623 lower and set the strength of magnetism of a second electromagnet 622 and a fourth electromagnet 624 higher.

In an embodiment, if a result of the monitoring indicates that only the user input 611 attempting to unfold an in-folded display is received and the user input 612 attempting to unfold an out-folded display is not received, the electronic device 610 may drive the first electromagnet 621 and the third electromagnet 623 so that the first electromagnet 621 and the third electromagnet 623 have the same polarity and repel each other, and drive the second electromagnet 622 and the fourth electromagnet 624 so that the second electromagnet 622 and the fourth electromagnet 624 have different polarities and attract each other.

If the motion 611 of the user attempting to apply force in order to unfold from a folded state is monitored, the electronic device 610 may control, in response to the user input, magnetism so that the in-folded displays 601 and 602 are easily unfolded.

In an embodiment, if the state is changed (for example, changed so as to unfold an in-folded display, or changed so as to unfold an out-folded display) due to force applied by the user to the electronic device 610, the electronic 610 device may determine the changed state through a sensor. For example, a distance between a magnet and/or electromagnet included in the electronic device 610 and the magnetic sensor may be changed due to force applied by the user to the electronic device 610. The electronic device 610 may detect the strength of magnetism of the magnet and/or electromagnet changed due to change in the distance, using the magnetic sensor. The electronic device 610 may determine a state change of the electronic device 610 based on electrical characteristics induced through the detected magnetism strength or magnetic field change.

Figure 7:
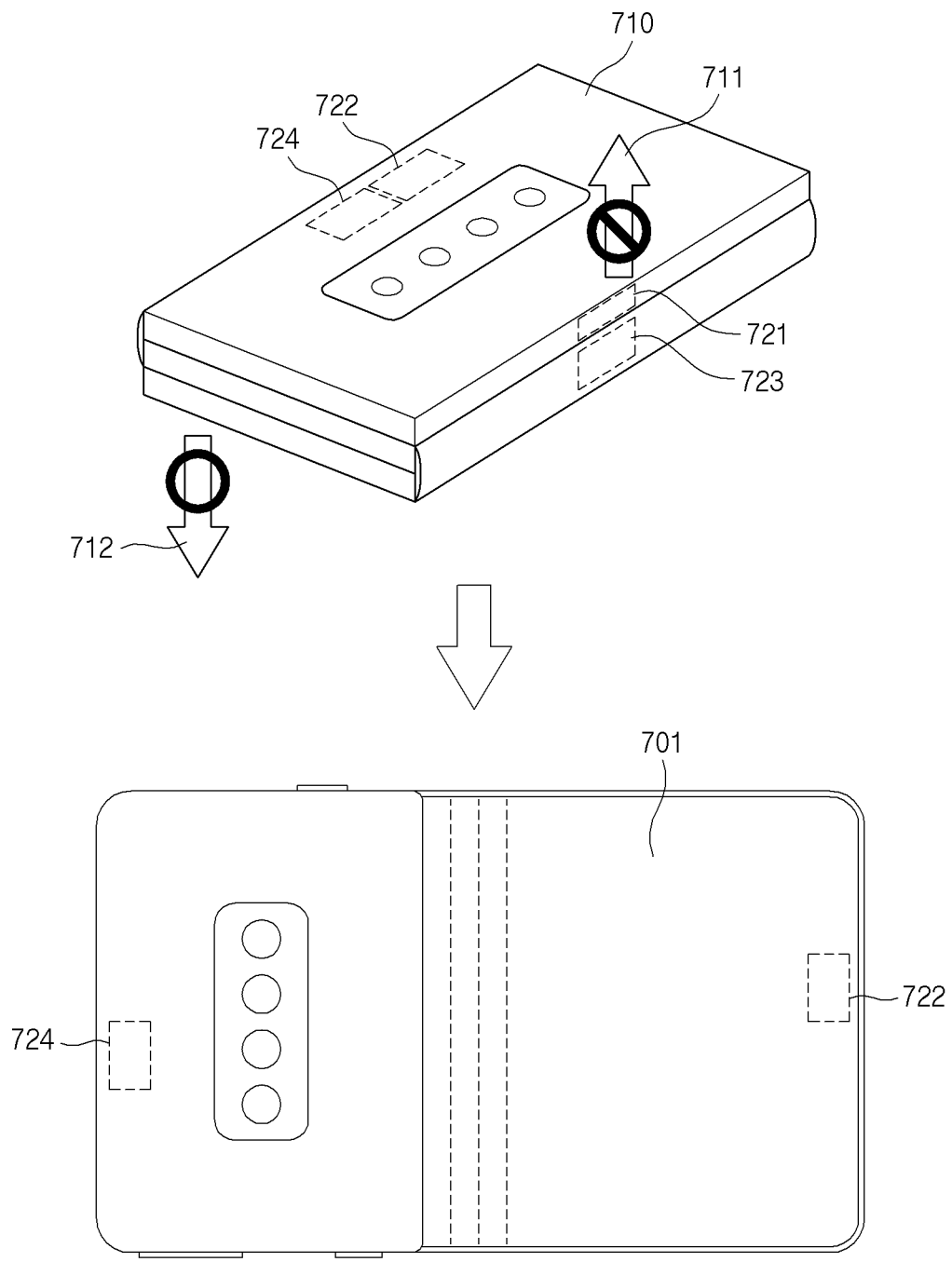
FIG. 7 is an example diagram illustrating a method for an electronic device having a foldable structure to unfold an out-folded display by controlling magnetism according to an embodiment of the disclosure.

FIG. 7 is an example diagram illustrating a method for an electronic device having a foldable structure to unfold an out-folded display by controlling magnetism according to an embodiment. The out-folding may represent a state in which a display region is folded outwards.

FIG. 7 illustrates an electronic device 710 having a foldable structure with two hinge structures. The electronic device having a foldable structure with two hinge structures may include displays 601, 602, and 701 (FIG. 7) on at least three sides. The electronic device 710 having a foldable structure with two hinge structures illustrated in FIG. 7 may be capable of both out-folding and/or in-folding.

Referring to FIG. 7, the electronic device 710 may detect a user input 712 attempting to unfold an out-folded display. The electronic device 710 may monitor a state of the electronic device 710 using a sensor included in or operatively coupled to the electronic device 710. For example, the electronic device 710 may monitor a state of the electronic device 710 using a grip sensor and/or motion sensor.

In an embodiment, if a result of the monitoring indicates that only the user input 712 attempting to unfold an out-folded display is received and the user input 711 attempting to unfold an in-folded display is not received, the electronic device 710 may set the strength of magnetism of a first electromagnet 721 and a third electromagnet 723 higher and set the strength of magnetism of a second electromagnet 722 and a fourth electromagnet 724 lower.

In an embodiment, if a result of the monitoring indicates that only the user input 712 attempting to unfold an out-folded display is received and the user input 711 attempting to unfold an in-folded display is not received, the electronic device 710 may drive the second electromagnet 722 and the fourth electromagnet 724 so that the second electromagnet 722 and the fourth electromagnet 724 have the same polarity and repel each other, and drive the first electromagnet 721 and the third electromagnet 723 so that the first electromagnet 721 and the third electromagnet 723 have different polarities and attract each other.

If the motion 712 of the user attempting to apply force in order to unfold from a folded state is monitored, the electronic device 710 may control, in response to the user input, magnetism so that the out-folded display 701 is easily unfolded.

The electronic device may also secure the accuracy of the magnetic sensor by controlling magnetism. This will be described in detail with reference to FIG. 8.

Figure 8:
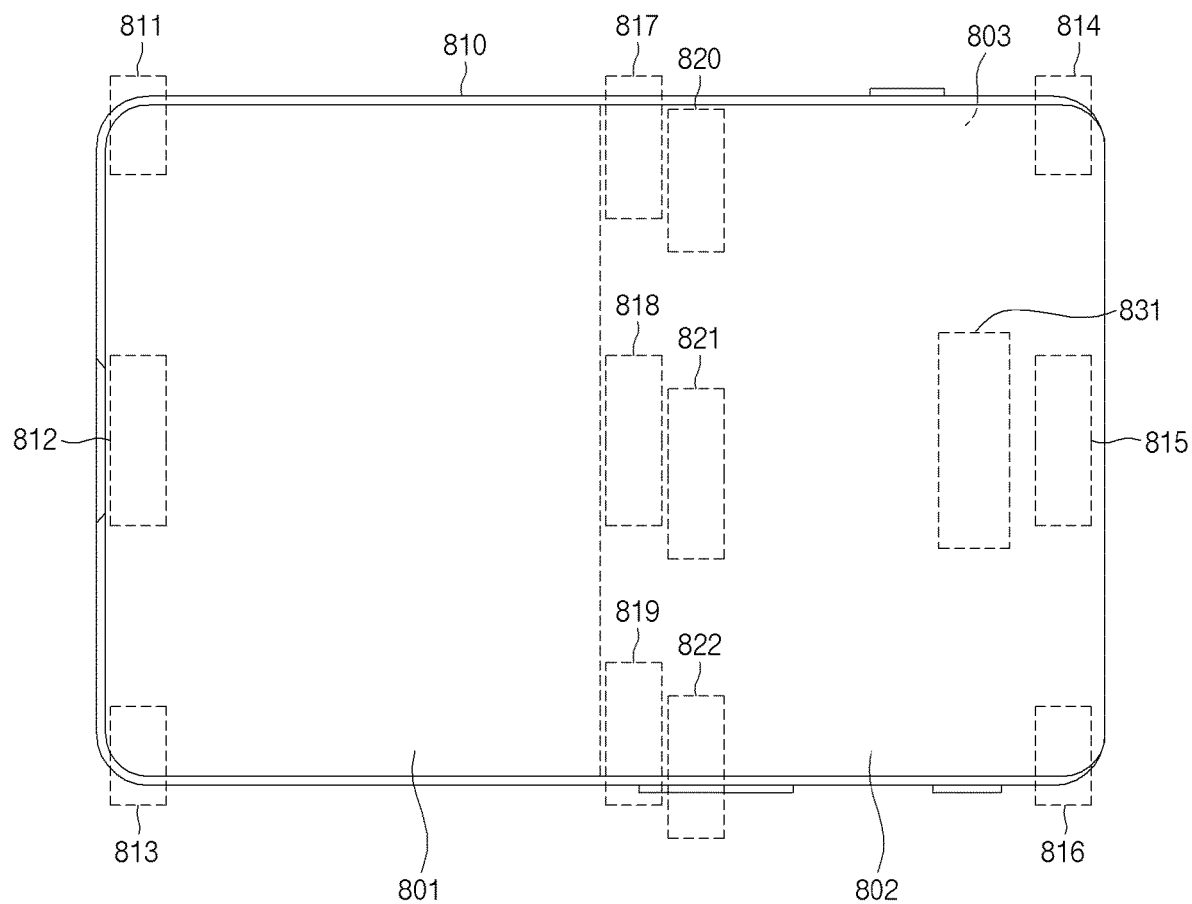
FIG. 8 is an example diagram illustrating a method for an electronic device having a foldable structure to secure the accuracy of a magnetic sensor by controlling magnetism according to an embodiment of the disclosure.

FIG. 8 is an example diagram illustrating a method for an electronic device having a foldable structure to secure the accuracy of a magnetic sensor by controlling magnetism according to an embodiment.

FIG. 8 illustrates an electronic device 810 having a foldable structure with two hinge structures. The electronic device having a foldable structure with two hinge structures may include displays 801, 802, and 803 on at least three sides. The electronic device 810 having a foldable structure with two hinge structures illustrated in FIG. 8 may be capable of both out-folding and/or in-folding.

Referring to FIG. 8, the electronic device 810 have unfolded displays 801 and 802 on two sides which are in-folded. The electronic device 810 may include at least one electromagnet 811, 812, 813, 814, 815, 816, 817, 818, 819, 820, 821, or 822.

In an embodiment, according to a condition, the electronic device 810 may control magnetism of each of at least one electromagnet 811, 812, 813, 814, 815, 816, 817, 818, 819, 820, 821, and 822 among the at least one electromagnet 811, 812, 813, 814, 815, 816, 817, 818, 819, 820, 821, and 822 so as to maintain only magnetism of a desired electromagnet.

For example, as illustrated in FIG. 8, if a magnetic sensor 831 is mounted near the fifth electromagnet 815, the electronic device 810 may reduce an influence of the fifth electromagnet 815 on performance of the magnetic sensor 831 by adjusting magnetism of the fifth electromagnet 815 according to a condition.

In an embodiment, the at least one electromagnet 811, 812, 813, 814, 815, 816, 817, 818, 819, 820, 821, and 822 illustrated in FIG. 8 may be partially replaced with a magnet. A magnet may be mounted only with a size that is necessarily required for basic operation of the electronic device 810 and electromagnets may be mounted for all other cases where magnetism is required so that the electronic device 810 may minimize an influence of magnetism on internal and/or external elements by controlling the magnetism of the electromagnets.

In an embodiment, if magnetism is not required (for example, when an in-folded or out-folded display is unfolded, when a cover is not coupled, or when a cradle is open), the electronic device 810 may secure maximum performance of internal elements by minimizing an influence of magnetism on the internal elements by demagnetizing the electromagnets.

In an embodiment, in consideration of the characteristic that magnetism becomes weaker when a temperature of the electronic device 810 increases, the electronic device 810 may minimize an influence of the temperature by increasing the strength of the magnetism if it is determined that the temperature has increased using a sensor.

In an embodiment, the electronic device 810 may also control the magnetism when an external electronic device (e.g., stylus pen, case, wireless charger) is detached from and/or attached to the electronic device 810 so as to facilitate the detaching and/or attaching of the external electronic device.

The electronic device according to one or more embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

One or more embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with one or more embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

One or more embodiments as set forth herein may be implemented as software (e.g., the program 140) including one or more instructions that are stored in a storage medium (e.g., internal memory 136 or external memory 138) that is readable by a machine (e.g., the electronic device 101). For example, at least one processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to one or more embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™, or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities, and some of the multiple entities may be separately disposed in different components. According to one or more embodiments, one or more of the above-described components may be omitted, or one or more other components may be added. Alternatively or additionally, a plurality of components (e.g., modules or programs) may be integrated into a single component. In such a case, according to one or more embodiments, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a first housing;
a second housing movably coupled to the first housing;
a third housing movably coupled to the second housing;
a flexible display on at least a portion of the first housing, the second housing, and the third housing;
at least one sensor;
a plurality of electromagnets comprising:
   a first electromagnet provided on a portion of the first housing,
   a second electromagnet provided on a first portion of the second housing,
   a third electromagnet provided on a second portion of the second housing, and
   a fourth electromagnet provided on a portion of the third housing;
at least one processor operatively coupled to the at least one sensor; and
a memory operatively coupled to the at least one processor,
wherein the memory stores instructions that, when executed by the at least one processor, cause the electronic device to:
   detect, through the at least one sensor, a state change in at least one of first arrangement of the first housing with respect to the second housing or second arrangement of the third housing with respect to the second housing, and based on the state change, control magnetism of at least one electromagnet among the plurality of electromagnets, wherein the detected state change comprises a determination, by using the at least one sensor, that a state of the electronic device is changed from a first state to a second state, wherein the first state corresponds to a state in which the first housing is in-folded with respect to the second housing and the third housing is out-folded with respect to the second housing, wherein the second state corresponds to a state in which the in-folded first housing with respect to the second housing is un-folded and the out-folded third housing with respect to the second housing is out-folded, and wherein the controlled magnetism of the at least one electromagnet comprises:

reducing a first strength of the first electromagnet, increasing a second strength of the second electromagnet, reducing a third strength of the third electromagnet, and increasing a fourth strength of the fourth electromagnet.

2. The electronic device of claim 1, wherein the instructions, when executed by the at least one processor, further cause the electronic device to adjust the magnetism by adjusting at least one of magnetic strength or polarity strength of the at least one electromagnet.

3. The electronic device of claim 1, wherein the at least one sensor comprises at least one of an accelerometer, a gyroscope, a barometer, a magnetic sensor, an angle sensor, a hall sensor, or an electromagnetic sensor.

4. The electronic device of claim 3, wherein the at least one sensor may further include a sensor for processing a value output through at least one of the accelerometer, the gyroscope, the barometer, the magnetic sensor, the angle sensor, the hall sensor, or the electromagnetic sensor.

5. The electronic device of claim 1, wherein the instructions, when executed by the at least one processor, further cause the electronic device to adjust the magnetism of the at least one electromagnet by adjusting intensity of current flowing through the at least one electromagnet.

6. The electronic device of claim 1, wherein the instructions, when executed by the at least one processor, further cause the electronic device to:

determine a folding state of the electronic device, and select the at least one electromagnet to be controlled based on the determined folding state.

7. The electronic device of claim 1, wherein the detected state change comprises a determination, by using the at least one sensor, that the state of the electronic device is changed from the first state to a third state, wherein the third state corresponds to a state in which the in-folded first housing with respect to the second housing is in-folded and the out-folded third housing with respect to the second housing is un-folded, and wherein the controlled magnetism of the at least one electromagnet comprises:

increasing the first strength of the first electromagnet, reducing the second strength of the second electromagnet, increasing the third strength of the third electromagnet, and reducing the fourth strength of the fourth electromagnet.

8. The electronic device of claim 6, wherein the instructions, when executed by the at least one processor, further cause the electronic device to, based on the state of the electronic device, which is determined to be a state in which the electronic device does not require magnetism, deactivate strength of magnetism of the plurality of electromagnets mounted in the electronic device, and deactivate strength of magnetism of the plurality of electromagnets mounted in the electronic device.

9. The electronic device of claim 6, wherein the instructions, when executed by the at least one processor, further cause the electronic device to:

adjust magnetism of electromagnet mounted in a first surface to which a display included in the electronic device is attached, to different polarities, and deactivate electromagnet mounted in a second surface to which the display is not attached.

10. A method performed by an electronic device, the method comprising:

detecting a state change in at least one of first arrangement of a first housing included in the electronic device with respect to a second housing in the electronic device or second arrangement of a third housing in the electronic device with respect to the second housing, through at least one sensor operatively coupled to the electronic device; and based on the state change, controlling magnetism of at least one electromagnet among a plurality of electromagnets in the electronic device, wherein the detected state change comprises a determination, by using the at least one sensor, that a state of the electronic device is changed from a first state to a second state, wherein the first state corresponds to a state in which the first housing is in-folded with respect to the second housing and the third housing is out-folded with respect to the second housing, wherein the second state corresponds to a state in which the in-folded first housing with respect to the second housing is un-folded and the out-folded third housing with respect to the second housing is out-folded, and wherein the controlling the magnetism of the at least one electromagnet comprises:

reducing a first strength of a first electromagnet provided on a portion of the first housing, increasing a second strength of a second electromagnet provided on a first portion of the second housing, reducing a third strength of a third electromagnet provided on a second portion of the second housing, and increasing a fourth strength of a fourth electromagnet provided on a portion of the third housing.

11. The method of claim 10, further comprising:

controlling the magnetism by adjusting at least one of magnetism strength or polarity strength of the at least one electromagnet.

12. The method of claim 10, wherein the at least one sensor may include at least one of an accelerometer, a gyroscope, a barometer, a magnetic sensor, an angle sensor, a hall sensor, or an electromagnetic sensor.

13. The electronic device of claim 12, wherein the at least one sensor may further include a sensor for processing a value output through at least one of the accelerometer, the gyroscope, the barometer, the magnetic sensor, the angle sensor, the hall sensor, or the electromagnetic sensor.

14. The electronic device of claim 10, further comprising:
adjusting the magnetism of the at least one electromagnet by adjusting intensity of current flowing through the at least one electromagnet.

15. The method of claim 10, further comprising:
determining a folding state of the electronic device; and
selecting the at least one electromagnet to be controlled based on the determined folding state.

16. The method of claim 10, wherein the detected state change comprises a determination, by using the at least one sensor, that the state of the electronic device is changed from the first state to a third state,
    wherein the third state corresponds to a state in which the in-folded first housing with respect to the second housing is in-folded and the out-folded third housing with respect to the second housing is un-folded, and
    wherein the controlling the magnetism of the at least one electromagnet comprises:
        increasing the first strength of the first electromagnet,
        reducing the second strength of the second electromagnet,
        increasing the third strength of the third electromagnet, and
        reducing the fourth strength of the fourth electromagnet.

17. The method of claim 15, further comprising, based on the state of the electronic device, which is determined to be a state in which the electronic device does not require magnetism, deactivating strength of magnetism of the plurality of electromagnets mounted in the electronic device.

18. The method of claim 15, further comprising:
adjusting magnetism of electromagnet, mounted in a first surface to which a display in the electronic device is attached, to different polarities, and
deactivating electromagnet mounted in a second surface to which the display is not attached.

* * * * *